(12) United States Patent
Kim

(10) Patent No.: US 9,733,083 B2
(45) Date of Patent: Aug. 15, 2017

(54) MOTION SENSING METHOD AND USER EQUIPMENT THEREOF

(71) Applicant: Samsung Electronics Co., Ltd., Suwon-si, Gyeonggi-do (KR)

(72) Inventor: Dae-Kwang Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 14/620,829

(22) Filed: Feb. 12, 2015

(65) Prior Publication Data

US 2015/0233714 A1 Aug. 20, 2015

(30) Foreign Application Priority Data

Feb. 18, 2014 (KR) ........................ 10-2014-0018556

(51) Int. Cl.
*G01C 17/38* (2006.01)
*G01C 17/30* (2006.01)

(52) U.S. Cl.
CPC ............. *G01C 17/38* (2013.01); *G01C 17/30* (2013.01)

(58) Field of Classification Search
CPC ................................. G01C 17/30; G01C 17/38
USPC ......................................................... 33/356
See application file for complete search history.

(56) References Cited

U.S. PATENT DOCUMENTS

| 2004/0020064 A1* | 2/2004 | Levi | G01C 19/42 33/356 |
| 2006/0103631 A1* | 5/2006 | Mashima | G06F 1/1626 345/158 |
| 2008/0319708 A1 | 12/2008 | Cho | |
| 2013/0281883 A1* | 10/2013 | Nishida | A61B 5/7282 600/586 |
| 2015/0109200 A1* | 4/2015 | Lee | G06F 3/017 345/156 |
| 2015/0233714 A1* | 8/2015 | Kim | G01C 17/30 33/356 |
| 2015/0247877 A1* | 9/2015 | Kanemoto | G01P 1/04 73/504.04 |
| 2015/0295613 A1* | 10/2015 | Kim | H04B 1/3838 455/550.1 |
| 2016/0033279 A1* | 2/2016 | Sato | G01C 22/006 701/510 |
| 2016/0057553 A1* | 2/2016 | Ryu | H04M 1/6066 340/4.41 |
| 2016/0081625 A1* | 3/2016 | Kim | H04W 4/008 600/301 |
| 2016/0173185 A1* | 6/2016 | Kang | H04B 7/0608 375/267 |

(Continued)

FOREIGN PATENT DOCUMENTS

| JP | 2009-109500 A | 5/2009 |
| KR | 2003-0082280 A | 10/2003 |
| KR | 10-2007-0049419 A | 5/2007 |

*Primary Examiner* — Yaritza Guadalupe-McCall
(74) *Attorney, Agent, or Firm* — Jefferson IP Law, LLP

(57) ABSTRACT

A method configured to operate an electronic device is provided. The method includes first sensing information of a geomagnetic sensor and second sensing information of at least one motion sensor. Designated attributes of the first sensing information and the second sensing information are compared. When the geomagnetic sensor is determined as a specific state depending on the comparison result, performance of a designated internal device is controlled.

20 Claims, 15 Drawing Sheets

(56) References Cited

U.S. PATENT DOCUMENTS

| | | | |
|---|---|---|---|
| 2016/0187134 A1* | 6/2016 | Kimishima | G01C 17/28 33/356 |
| 2016/0205658 A1* | 7/2016 | Kubota | H04N 5/232 455/414.2 |
| 2016/0249864 A1* | 9/2016 | Kang | A61B 5/02438 |
| 2016/0253218 A1* | 9/2016 | Kim | G06F 9/5094 |
| 2016/0255187 A1* | 9/2016 | Song | H04M 1/22 |
| 2016/0261993 A1* | 9/2016 | Liao | H04L 67/22 |

* cited by examiner

|  | GEOMAGNETIC SENSOR | | GYRO SENSOR | ACCELERATION |
| NO | 411 | | 413 | 415 |
| --- | --- | --- | --- | --- |
| | ROTATION | ACCELERATION | | |
| 1 | O | O | OPERATION COMPARISON | OPERATION COMPARISON |
| 2 | X | O | SIMPLE COMPARISON | OPERATION COMPARISON |
| 3 | O | X | OPERATION COMPARISON | SIMPLE COMPARISON |
| 4 | X | X | SIMPLE COMPARISON | SIMPLE COMPARISON |
| ⋮ | | | | |

DEDICATED TABLE FOR COMPARISON GROUP
OF GEOMAGNETIC SENSOR 410

FIG.4B

| NO | GEOMAGNETIC SENSOR 421 | GYRO SENSOR 423 | SENSOR 425 | RESULT 427 |
|---|---|---|---|---|
| 1 | O | O | O | NORMAL |
| 2 | O | X | O | ABNORMAL |
| 3 | O | O | X | ABNORMAL |
| 4 | O | X | X | ABNORMAL |
| 5 | X | X | X | NORMAL |
| 6 | X | O | X | ABNORMAL |
| 7 | X | X | O | ABNORMAL |
| 8 | X | O | O | ABNORMAL |
| ⋮ | | | | |

STATE DETERMINE TABLE OF GEOMAGNETIC SENSOR 420

DEGREE OF USING DEVICE DEPENDING ON PROGRAM (UNIT:%)

| NO | PROGRAM | DISPLAY | COMMUNI-CATION MODULE | CAMERA | PRO-CESSOR |
|---|---|---|---|---|---|
| 1 | Facebook | 70 | 95 | 15 | 35 |
| 2 | Picasa | 85 | 20 | 90 | 70 |
| 3 | m player | 30 | 75 | 10 | 50 |
| ⋮ | | | ⋮ | | |

FIG.6

MOTION SENSING METHOD AND USER EQUIPMENT THEREOF

CROSS-REFERENCE TO RELATED APPLICATION(S)

This application claims the benefit under 35 U.S.C. §119(a) of a Korean patent application filed on Feb. 18, 2014 in the Korean Intellectual Property Office and assigned Serial number 10-2014-0018556, the entire disclosure of which is hereby incorporated by reference.

TECHNICAL FIELD

The present disclosure relates to a method for sensing motion information in an electronic device and the electronic device thereof

BACKGROUND

An electronic device mounts various motion sensors to provide various application functions for user convenience. For example, a User Equipment (UE) (referred to as an electronic device) such as a smartphone, may use a geomagnetic sensor, a gyro sensor, an acceleration sensor, etc. as a motion sensor. The electronic device may detect rotation, movement, a current position or state, etc. via these motion sensors. A value detected via the motion sensor is utilized as an input or an output value for various applications.

The above information is presented as background information only to assist with an understanding of the present disclosure. No determination has been made, and no assertion is made, as to whether any of the above might be applicable as prior art with regard to the present disclosure.

SUMMARY

A geomagnetic sensor included in an electronic device is capable of detecting a magnetic field of at least one axis of an x-axis, a y-axis, and a z-axis. A measurement value obtained by the geomagnetic sensor may be influenced by a current or a voltage flowing through the device or a neighboring electric part (influencing a magnetic field). This value contains an error and the User Equipment (UE) may measure a value different from intensity of a magnetic field actually measured in the outside of the UE. When the number of parts mounted on an electronic device increases, parts disposed in the neighborhood of the geomagnetic sensor are more densely arranged, which may increase measurement errors. Also, to perform a complicated function, a large processing load in processor of the UE may cause a current transient and increase the possibility of a sensor error.

Aspects of the present disclosure are to address at least the above-mentioned problems and/or disadvantages and to provide at least the advantages described below. Accordingly, an aspect of the present disclosure is to provide an electronic device including at least one other motion sensor (e.g., a gyro sensor, an acceleration sensor, etc.) for providing various functions. The electronic device may detect the position or movement of the electronic device, or a change in the position or a state of the position, etc. via other motion sensors. Information measured by these other motion sensors may be used for determining an operation state of the geomagnetic sensor is a normal state or an abnormal state. In the abnormal state, the electronic device may correct the abnormal state of the geomagnetic sensor.

In accordance with an aspect of the present disclosure, a method for operating an electronic device is provided. The method includes obtaining first sensing information of a geomagnetic sensor and second sensing information of at least one motion sensor, comparing designated attributes of the first sensing information and the second sensing information, and when determining an operation state of the geomagnetic sensor as a specific state depending on the comparison result, controlling performance of a designated internal device.

In accordance with another aspect of the present disclosure, an electronic device is provided. The electronic device includes a geomagnetic sensor for obtaining first sensing information, a motion sensor for obtaining second sensing information, and a processor for obtaining the first sensing information and the second sensing information from the at least one motion sensor, comparing designated attributes of the first sensing information and the second sensing information, and when determining an operation state of the geomagnetic sensor as a specific state depending on the comparison result, controlling performance of a designated internal device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A, 4B, and 4C are views illustrating an operation for detecting an error of sensing information of a geomagnetic sensor obtained by an electronic device according to an embodiment of the present disclosure;

FIG. 6 is a view illustrating an operation for controlling performance of a designated internal device in response to an operation state of a geomagnetic sensor in an electronic device according to an embodiment of the present disclosure;

Throughout the drawings, like reference numerals will be understood to refer to like parts, components, and structures.

DETAILED DESCRIPTION

Figure 1:
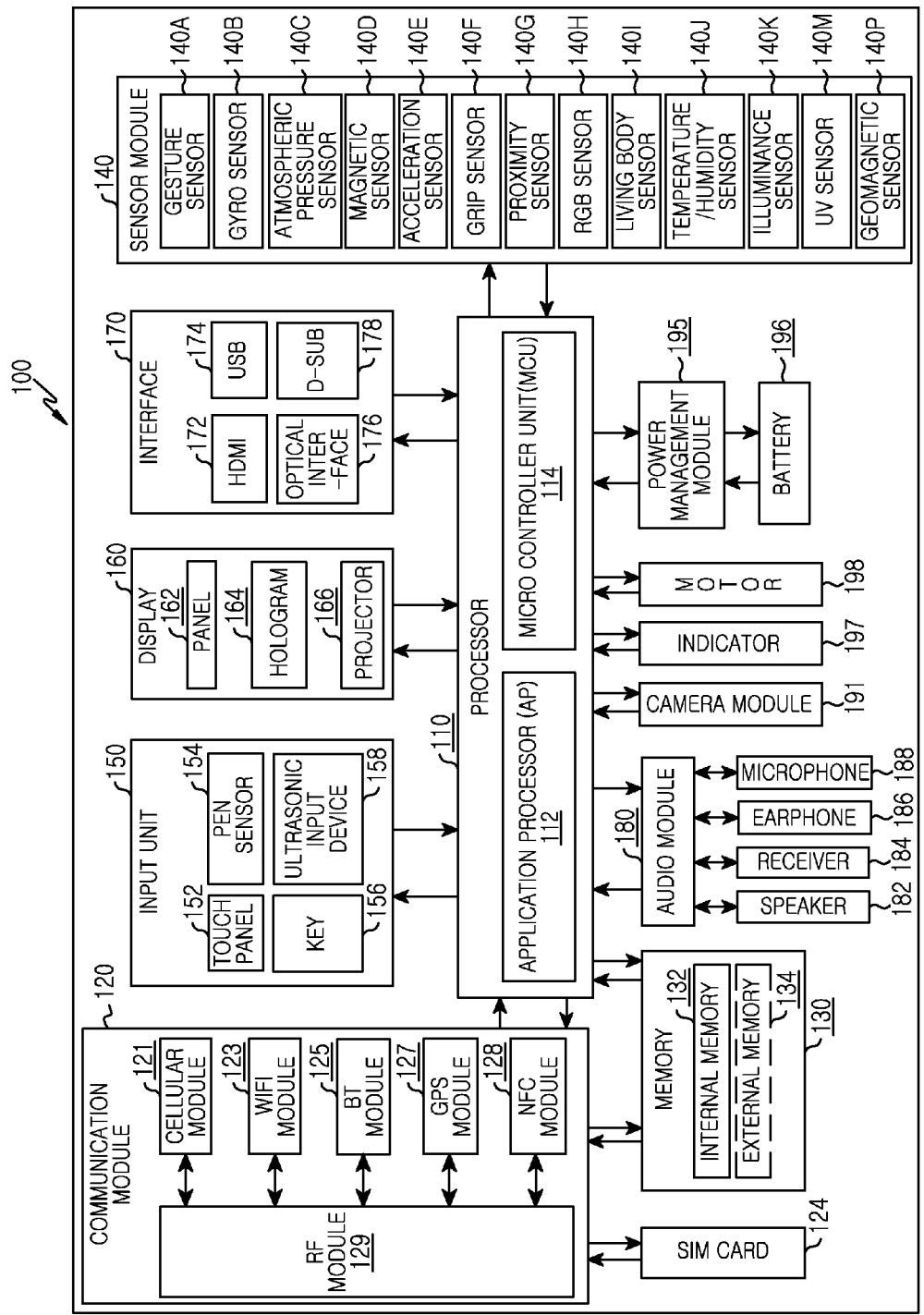
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An expression such as "include" or "may include", etc. that may be used for various embodiments of the present disclosure indicates existence of a disclosed relevant function, operation, or elements, etc., and does not limit additional one or more functions, operations, or elements, etc. Also, a terminology of "include" or "have", etc. in various embodiments of the present disclosure is intended for designating existence of a characteristic, a number, a step, an operation, an element, a part described in the specification or a combination thereof, and should be construed not to exclude in advance possibility of existence or addition of one or more other characteristics, a number, a step, an operation, an element, a part, or a combination thereof.

In various embodiments of the present disclosure, expression of 'or', etc. includes a certain or all combinations of words listed together. For example, 'A or B' may include A, may include B, or may include both A and B.

In various embodiments of the present disclosure, expressions of '1st', 2nd', 'first' or 'second' may modify various elements of the present disclosure, but do not limit sequence and/or importance, etc. of relevant elements. Also, the expressions may be used for discriminating one element from another element.

When it is mentioned that a certain element is 'connected' to another element or 'accesses' another element in various embodiments of the present disclosure, it should be understood that the element is directly connected to another element or accesses another element but still another element may exist in the interim. On the contrary, when it is mentioned that a certain element is 'directly connected' to another element or 'directly accesses' another element, it should be understood that still another element does not exist in the interim.

A terminology used for various embodiments of the present disclosure is used for describing a specific embodiment and not for limiting the present disclosure. Also, all terminologies used herein including technical or scientific terminologies should be construed to have the same meaning as that generated understood by a person of ordinary skill in the art, and should not be construed as ideal or excessively formal meaning unless defined otherwise.

An electronic device according to various embodiments of the present disclosure may include at least one of a smartphone including a communication function, a tablet Personal Computer (PC), a mobile phone, a video phone, an electronic book reader, a desktop PC, a laptop PC, a netbook computer, a Personal Digital Assistant (PDA), a Portable Multimedia Player (PMP), an MP3 player, a mobile medical device, a camera, or a wearable device (e.g., a Head-Mounted-Device (HMD) such as electronic glasses, electronic clothes, an electronic bracelet, an electronic necklace, an electronic accessory, an electronic tattoo, or a smart watch), a Television (TV), a Digital Video Disk (DVD) player, an audio, a refrigerator, an air conditioner, a cleaner, an oven, an electronic range, a washing machine, an air purifier, a set top box, a TV box (for example, Samsung HomeSync™, Apple TV™, or Google TV™), a game console, an electronic dictionary, an electronic key, a camcorder, a medical device (e.g., Magnetic Resonance Angiography (MRA), Magnetic Resonance Imaging (MRI), Computed Tomography (CT), a shooting device, an ultrasonic device, etc.), a navigation unit, a Global Positioning System (GPS) receiver, an Event Data Recorder (EDR), a Flight Data Recorder (FDR), an automobile infotainment device, electronic equipment for ship (e.g., a navigation unit for ship, and a gyro compass, etc.), an aviation electronic device, a security device, or a robot for industry or household, a portion of a furniture or a building/structure, an electronic board, an electronic signature input unit, a projector, or various measurement apparatus (e.g., waterworks, electricity, gas, or a radio wave measuring apparatus, etc.). An electronic device according to various embodiments of the present disclosure may be a combination of one or more among the above-mentioned various devices. Also, an electronic device according to various embodiments of the present disclosure is not limited to the above-mentioned devices.

Hereinafter, an electronic device according to various embodiments of the present disclosure is described with reference to the accompanying drawings. A terminology of a user used for various embodiments of the present disclosure may denote a person who uses an electronic device or a device (e.g., an artificial intelligence electronic device) that uses the electronic device.

FIG. 1 is a view illustrating a block diagram illustrating an electronic device according to an embodiment of the present disclosure.

Referring to FIG. 1, the electronic device 100 includes one or more processors 110, a communication module 120, a Subscriber Identity Module (SIM) card 124, a memory 130, a sensor module 140, an input unit 150, a display 160, an interface 170, an audio module 180, a camera module 191, a power management module 195, a battery 196, an indicator 197, and a motor 198.

At least one processor 110 is included in the electronic device 100 to perform a designated function of the electronic device 100. According to an embodiment of the present disclosure, the processor 110 may include one or more application processors (APs) 112, and one or more micro controllers (e.g., a micro controller unit (MCU) 114. According to another embodiment of the present disclosure, the processor 110 may be an application processor 112 and include one or more micro controllers 114, or may be functionally connected with one or more micro controllers 114. Though FIG. 1 illustrates the AP 112 and the MCU 114 are included inside the processor 110, the AP 112 and the MCU 114 may be configured separately and included in different Integrated Circuit (IC) packages, respectively. According to an embodiment of the present disclosure, the MCU 114 may be included in an IC package of the AP 112 and configured as one IC package. Though it is illustrated that the processor 110 includes the AP 112 or the MCU 114 as its element, this is an illustration for clear understanding, and the processor 110 may perform an operation of the AP 112 and/or the MCU 114

The AP 112 may drive an Operating System (OS) or an application to control hardware or software elements connected to the AP 112, and perform various data processes including multimedia data and operations. The AP 112 may be implemented, for example, as a System on a Chip (SoC). According to an embodiment of the present disclosure, the processor 112 may further include a Graphics Processing Unit (GPU) (not shown).

The MCU 114 may be a processor set to perform a designated operation. According to an embodiment of the present disclosure, the MCU 114 may obtain sensing information via one or more motion sensors (e.g., a gyro sensor 140B, an acceleration sensor 140E, or a geomagnetic sensor 140P), compare the obtained sensing information, and determine an operation state of the designated sensor (e.g., the geomagnetic sensor 140P) with reference to a database of the electronic device 100. In addition, though elements of the MCU 114 and the sensor module 140 are illustrated as separate elements in FIG. 1, the MCU 114 may be implemented to include at least a portion of (e.g., at least one of the gyro sensor 140B, the acceleration sensor 140E, or the geomagnetic sensor 140P) of the elements of the sensor module 140.

According to an embodiment of the present disclosure, the AP 112 or the MCU 114 may load an instruction or data received from at least one of a non-volatile memory or other elements, respectively, to a volatile memory and process the same. Also, the AP 112 or the MCU 114 may store data received from at least one of other elements or generated from at least one of other elements in a non-volatile memory.

A communication module 120 may perform data transmission/reception with other electronic devices (e.g., an electronic device 104 or a server 106) that are connected to the electronic device 100 (e.g., an electronic device 101) via a network. According to an embodiment of the present disclosure, the communication module 120 may include a cellular module 121, a Wireless Fidelity (Wi-Fi) module 123, a BlueTooth (BT) module 125, a GPS module 127, a Near Field Communication (NFC) module 128, and a Radio Frequency (RF) module 129.

The cellular module 121 may provide voice communication, video communication, a short message service, or an Internet service, etc. via a communication network (e.g., Long Term Evolution (LTE), LTE-Advanced (LTE-A), Code Division Multiple Access (CDMA), Wideband CDMA (WCDMA), Universal Mobile Telephone System (UMTS), Wireless Broadband (WiBro) or Global System for Mobile Communications (GSM), etc.). Also, the cellular module 121 may perform, for example, authentication of an electronic device in a communication network using a SIM (e.g., a SIM card 124). According to an embodiment of the present disclosure, the cellular module 121 may perform at least a portion of a function that may be provided by the AP 110. For example, the cellular module 121 may perform a portion of a multimedia control function.

According to an embodiment of the present disclosure, the cellular module 121 may include a Communication Processor (CP). Also, the cellular module 121 may be, for example, implemented as a SoC. Though elements such as the cellular module 121 (e.g., the CP), the memory 130, or the power management module 195, etc. are illustrated as elements separated from the AP 110, the AP 110 may implement a portion (e.g., the cellular module 121) of the above-described elements.

According to an embodiment of the present disclosure, the AP 112 or the cellular module 121 (e.g., a CP) may load an instruction or data received from at least one of a non-volatile memory or other elements, respectively, to a volatile memory and process the same. Also, the AP 112 or the cellular module 121 may store data received from at least one of other elements or generated from at least one of other elements in a non-volatile memory.

Each of the Wi-Fi module 123, the BT module 125, the GPS module 127, and the NFC module 128 may include a processor for processing data transmitted/received via a relevant module. Though the cellular module 121, the Wi-Fi module 123, the BT module 125, the GPS module 127, and the NFC module 128 have been illustrated as separate blocks in FIG. 1, a portion (e.g., two or more elements) of the cellular module 121, the Wi-Fi module 123, the BT module 125, the GPS module 127, and the NFC module 128 may be included inside one IC or an IC package. For example, a portion (e.g., a CP corresponding to the cellular module 121 and a Wi-Fi processor corresponding to the Wi-Fi module 123) of processors corresponding to the cellular module 121, the Wi-Fi module 123, the BT module 125, the GPS module 127, and the NFC module 128, respectively, may be implemented as a single SoC.

The RF module 129 may transmit/receive data, for example, transmit/receive an RF signal. The RF module 129 may include a transceiver, a Power Amp Module (PAM), a frequency filter, or a Low-Noise Amplifier (LNA), etc. Also, the RF module 129 may further include a part for transmitting/receiving radio waves, for example, a conductor or a conducting line, etc. Though the cellular module 121, the Wi-Fi module 123, the BT module 125, the GPS module 127, and the NFC module 128 share the RF module 129 in FIG. 1, at least one of the cellular module 121, the Wi-Fi module 123, the BT module 125, the GPS module 127, and the NFC module 128 may perform transmission/reception of an RF signal via a different RF module.

The SIM card 124 may be inserted to a slot formed in a specific position of the electronic device. The SIM card 124 may include unique identify information (e.g., Integrated Circuit Card Identifier (ICCID)) or subscriber information (e.g., International Mobile Subscriber Identity (IMSI)).

The memory 130 may include a built-in memory 132 or an external memory 134. The built-in memory 132 may include, for example, at least one of volatile memory (for example, Dynamic Random Access Memory (DRAM), Static RAM (SRAM), Synchronous DRAM (SDRAM), etc.) and a non-volatile memory (for example, One Time Programmable Read-Only Memory (OTPROM), Programmable ROM (PROM), Erasable PROM (EPROM), Electrically Erasable PROM (EEPROM), mask ROM, flash ROM, Not AND (NAND) flash memory, Not OR (NOR) flash memory, etc.).

According to an embodiment of the present disclosure, the built-in memory 132 may be a Solid State Drive (SSD). The external memory 134 may further include a flash drive, for example, Compact Flash (CF), Secure Digital (SD) card, Micro-SD, Mini-SD, extreme Digital (xD), or a memory stick, etc. The external memory 134 may be functionally connected with the electronic device 100 via various interfaces. According to an embodiment of the present disclosure, the electronic device 100 may further include a storage device (or a storing medium) such as a hard drive.

The sensor module 140 may measure a physical quantity or detect an operation state of the electronic device 100 and convert the measured or detected information to an electric signal. The sensor module 140 may include, for example, at least one of a gesture sensor 140A, a gyro sensor 140B, an atmospheric pressure sensor 140C, a magnetic sensor 140D, an acceleration sensor 140E, a grip sensor 140F, a proximity sensor 140G, a color sensor 140H (e.g., Red, Green, and Blue (RGB) sensor), a living body sensor 140I, a temperature/humidity sensor 140J, an illuminance sensor 140K, a Ultraviolet (UV) sensor 140M, and a Geomagnetic sensor 140P. Additionally or alternatively, the sensor module 140 may include, for example, an E-nose sensor (not shown), an ElectromMyoGraphy (EMG) sensor (not shown), an ElectroEncephaloGram (EEG) sensor (not shown), an ElectroCardioGram (ECG) sensor (not shown), an InfraRed (IR) sensor (not shown), an iris sensor (not shown), or a fingerprint sensor (not shown), etc. The sensor module 140 may further include a control circuit for controlling one or more sensors belonging thereto.

The input unit 150 may include a touch panel 152, a (digital) pen sensor 154, a key 156, or an ultrasonic input unit 158. The touch panel 153 may detect a touch input using at least one of capacitive, resistive, IR, and ultrasonic methods. Also, the touch panel 152 may further include a control circuit. A capacitive touch panel may detect a physical contact or perform proximity detection. The touch panel 152 may further include a tactile layer. In this case, the touch panel 152 may provide a tactile reaction to a user.

The (digital) pen sensor 154 may be implemented using, for example, a method which is same as or similar to receiving a user's touch input, or a separate sheet for detection. The key 156 may include, for example, a physical button, an optical key or a keypad. The ultrasonic input unit 158 may detect a sound wave using a microphone (e.g., a microphone 188) via an input unit that generates an ultrasonic signal to determine data, and may perform wireless detection. According to an embodiment of the present disclosure, the electronic device 100 may receive a user input from an external device (e.g., a computer or a server) connected thereto using the communication module 120.

The display 160 may include a panel 162, a hologram device 164 and a projector 166. The panel 162 may be, for example, a Liquid Crystal Display LCD or an Active-Matrix Organic Light-Emitting Diode (AMOLED), etc. The panel 162 may be implemented such that it is flexible, transparent, or wearable, for example. The panel 162 may be configured as one module together with the touch panel 152. The hologram device 164 may show a three-dimensional image in a vacant space using interference of light. The projector 166 may project light onto a screen to display an image. The screen may be positioned, for example, inside or outside the electronic device 100. According to an embodiment of the present disclosure, the display 160 may further include a control circuit for controlling the panel 162, the hologram device 164, or the projector 166.

The interface 170 may include, for example, a High Definition Multimedia Interface (HDMI) 172, a Universal Serial Bus (USB) 174, an optical interface 176, or a D-subminiature (D-sub) 178. The interface 170 may be, for example, included in a communication interface. Additionally or alternatively, the interface 170 may include, for example, a Mobile High-Definition Link (MHL) interface, an SD card/ Multimedia Card (MMC) interface or an Infrared Data Association (IrDA) standard interface.

The audio module 180 may convert sound into an electric signal and convert electric signals into sound. At least a portion of the audio module 180 may be, for example, included in an input/output (I/O) interface. The audio module 180 may process sound information input or output via a speaker 182, a receiver 184, an earphone 186, or a microphone 188, for example. The camera module 191 may capture a still image and a moving image. According to an embodiment of the present disclosure, the camera module 191 may include one or more image sensors (e.g., a front sensor or a rear sensor), a lens (not shown), an Image Signal Processor (ISP) (not shown), and a flash device (e.g., a Light Emitting Diode (LED) or a xenon lamp).

The power management module 195 may manage the power of the electronic device 100. Though not shown, the power management module 195 may include, for example, a Power Management IC (PMIC), a charging IC, a battery or a fuel gauge.

The PMIC may be mounted, for example, inside an IC or a SoC semiconductor. A charging method may be classified into a wired method and a wireless method. The charging IC may charge a battery and prevent overvoltage or an overcurrent from a charger. According to an embodiment of the present disclosure, the charging IC may include a charging IC for at least one of a wired charging method and a wireless charging method. For the wireless charging method, there different techniques such as a magnetic resonance method, a magnetic induction method, or an electromagnetic wave method, for example. An additional circuit for the wireless charging, for example, a coil loop and a circuit such as a resonance circuit, or a rectifier, etc. may be included.

The battery gauge may measure, for example, the battery 196, a voltage while charging, a current, or temperature. The battery 196 may store or generate electricity, and supply power to the electronic device 100 using the stored or generated electricity. The battery 196 may include, for example, a rechargeable battery or a solar battery.

An indicator 197 may display a specific state of the electronic device 100 or a portion thereof (e.g., the AP 110), for example, a booting state, a message state, or a charging state, etc. A motor 198 may convert an electric signal to mechanical vibration. Though not shown, the electronic device 100 may include a processor (e.g., GPU) for supporting a mobile TV. The processor for supporting the mobile TV may process, for example, media data that complies with a standard of Digital Multimedia Broadcasting (DMB), Digital Video Broadcasting (DVB), or a media flow, etc.

Each of the above-described elements of the electronic device according to various embodiments of the present disclosure may include one or more parts, and a name of an element may change based on the electronic device type. The electronic device according to various embodiments of the present disclosure may include at least one of the above-described elements, may omit a portion of the elements, or further include additional elements. Also, a portion of the elements of the electronic device according to various embodiments of the present disclosure may combine to form one entity, thereby equally performing the functions of the relevant elements before the combination.

Figure 2:
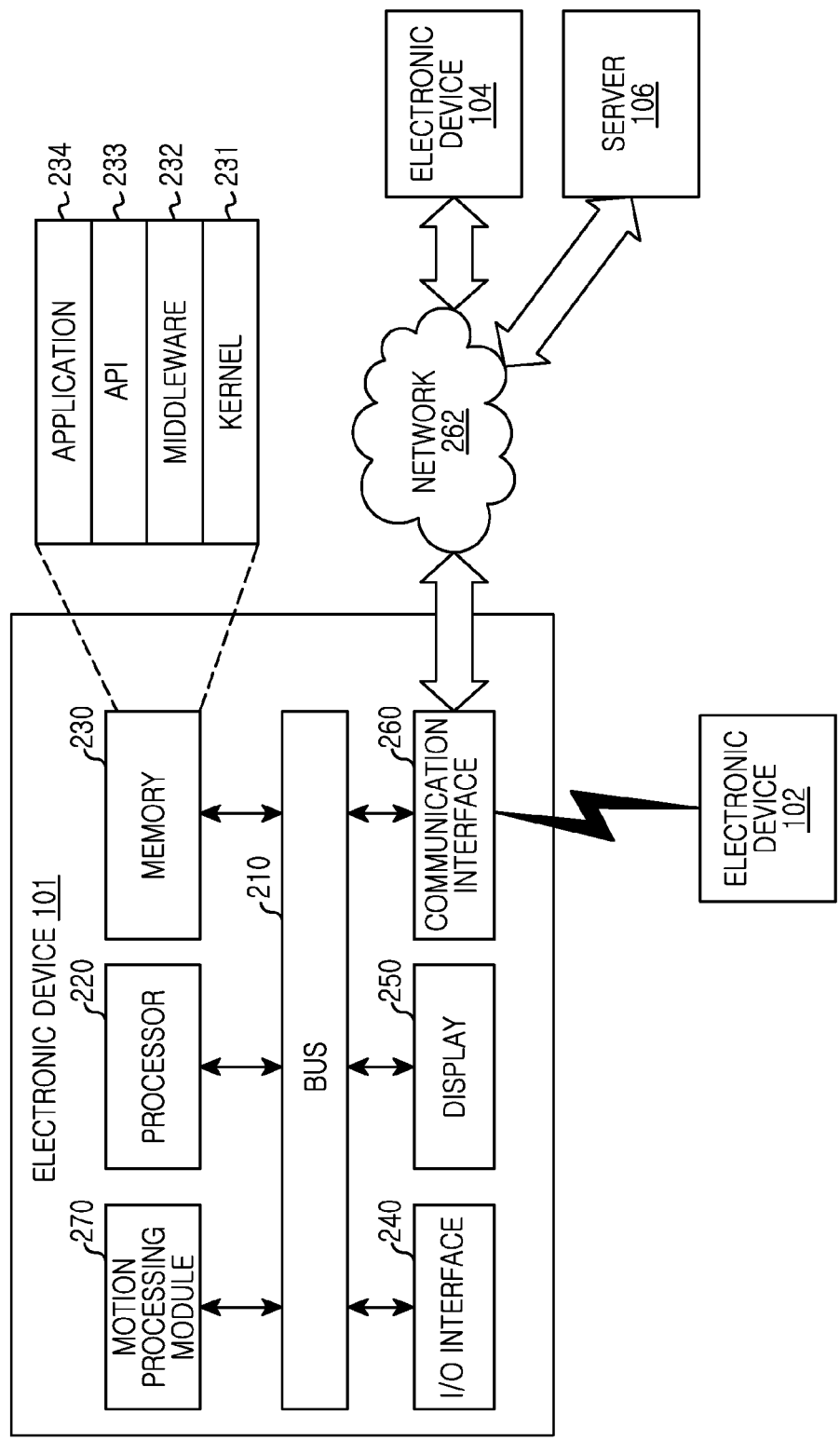
FIG. 2 is a view illustrating a network environment including an electronic device according to an embodiment of the present disclosure.

FIG. 2 is a view illustrating a network environment including an electronic device according to an embodiment of the present disclosure.

Referring to FIG. 2, the electronic device 101 may form, for example, the entirety or a portion of the electronic device 100 illustrated in FIG. 1 and may include a bus 210, a processor 220, a memory 230, an I/O interface 240, a display 250, a communication interface 260, and a motion processing module 270.

A bus 210 connects the above-described elements with each other, and transfers a communication signal (e.g., a control message) between the above-described elements.

The processor 220 may, for example, receive an instruction from the other elements (e.g., the memory 230, the I/O interface 240, the display 250, the communication interface 260, or the motion processing module 270) via the bus 210, decipher the received instruction, and perform an operation or a process data corresponding to the deciphered instruction.

The memory 230 (e.g., the memory 130) may store an instruction or data received or generated from the processor 220 and other elements (e.g., the I/O interface 240, the display 250, the communication interface 260, or the motion processing module 270). The memory 230 may include, for example, programming modules such as a kernel 231, a middleware 232, an Application Programming Interface (API) 233, and an application 234, etc. Each of the programming modules may be configured using software, firmware, hardware, and a combination of two or more of these.

The kernel 231 may control or manage system resources (e.g., the bus 210, the processor 220, or the memory 230, etc.) used for executing an operation or a function implemented in the other programming modules, for example, the middleware 232, the API 233, or the application 234. Also, the kernel 231 may provide an interface allowing the middleware 232, the API 233, or the application 234 to access, control, and manage elements of the electronic device 101.

The middleware 232 may enable the API 233 or the application 234 to communicate with the kernel 231. Also, the middleware 232 may control task requests using, for example, a method of assigning an order of priority that may use a system resource (e.g., the bus 210, the processor 220, or the memory 230, etc.) of the electronic device 101 with respect to task requests received from the application 234.

The API 233 is an interface for allowing the application 234 to control a function provided by the kernel 231 or the middleware 232, and may include at least one interface or a function (e.g., an instruction) for file control, window control, image processing or character control, etc.

The application 234 may allow information exchange between the electronic device 101 and an external electronic device (e.g., an electronic device 102 or an electronic device 104). The information exchange may include, for example, a notify transfer application for transferring specific information to an external electronic device, or a device management application for managing an external electronic device. According to various embodiments of the present disclosure, the application 234 may include an application additionally designated depending on the attribute (e.g., the type of the electronic device) of an external electronic device (e.g., the electronic device 102 or the electronic device 104).

The I/O interface 240 may transfer an instruction or data input from a user via a sensor (e.g., an acceleration sensor, a gyro sensor) or an input unit (e.g., a keyboard or a touchscreen) to the processor 220, the memory 230, the communication interface 260, or the motion processing module 270 via the bus 210, for example. For example, the I/O interface 240 may provide data regarding a user's touch input via a touchscreen to the processor 220. Also, the I/O interface 240 may output an instruction or data received from, for example, the processor 220, the memory 230, the communication interface 260, or the motion processing module 270 via the bus 210 via an output unit (e.g., a speaker or a display). For example, the I/O interface 240 may output voice data processed via the processor 220 to a user via the speaker.

The display 250 may display various information (e.g., multimedia data or text data, etc.) to the user. Also, the display 250 may be a touchscreen that inputs an instruction by touching or placing an input device in proximity to the display.

The communication interface 260 (e.g., the communication module 120) may enable communication between the electronic device 101 and the external device (e.g., the electronic device 104 or the server 106). For example, the communication interface 260 may connect with the network 262 via wireless communication or wired communication to communicate with an external device. The wireless communication may include, for example, at least one of Wi-Fi, BT, NFC, GPS, and cellular communication (e.g., LTE, LTE-A, CDMA, WCDMA, UMTS, WiBro, or GSM, etc.). The wired communication may include, for example, USB, HDMI, Recommended Standard 232 (RS-232) and Plain Old Telephone Service (POTS).

According to an embodiment of the present disclosure, the network 262 may be a communication network. The communication network may include at least one of a computer network, the Internet, Internet of things, or a telephone network. According to an embodiment of the present disclosure, a protocol (e.g., transport layer protocol, data link layer protocol, or a physical layer protocol) for communication between the electronic device 101 and an external device may be supported by at least one of the application 234, the API 233, the middleware 232, the kernel 231, and the communication interface 260)

The motion processing module 270 may obtain state information of the electronic device via one or more sensors included in the electronic device 101, and determine an operation state (e.g., a normal state or an abnormal state) of the geomagnetic (or a geomagnetic field) sensor 140P based on information of a designated attribute among the obtained state information (e.g., sensing information). The motion processing module 270 may obtain a first sensing information from the geomagnetic sensor 140P, obtain a second sensing information from a designated motion sensor, compare designated attributes of the first sensing information and the second sensing information, and determine an operation state of the geomagnetic sensor based on the comparison result and control the performance of a sensor.

The motion processing module 270 may determine an angular velocity information (i.e., rotation information) of the electronic device via the geomagnetic sensor and may determine movement information of the electronic device as the first sensing information. The motion processing module 270 may determine the movement information includes velocity information and acceleration information. The motion processing module 270 may implement at least one of a gyro sensor, an acceleration sensor, a slope sensor, and a gravity sensor included in the electronic device as a motion sensor. The motion processing module 270 may determine movement information from the acceleration sensor and may determine angular velocity information from the gyro sensor as the second sensing information. The motion processing module 270 may determine if the rotation angular velocity information of the first sensing information is within a designated range. The motion processing module 270 may determine if the first sensing information is within a designated range. The motion processing module 270 may determine at least one of a display unit, a communication module, a camera module, and a processor is a designated internal device based on a data table. The motion processing module 270 may control performance by controlling a current supplied to an internal device and or control a data processing amount of the internal device. After the controlling operation, the motion processing module 270 may repeatedly obtain the first sensing information, obtain the second sensing information, and compare the designated attributes. In the case where the comparison result determines an operation state of the geomagnetic sensor as a normal state, the motion processing module 270 may maintain control of the designated internal device. The motion processing module 270 may determine that the comparison result deviates from the range that is designated as normal state thereby determining the device has entered a specific state. The motion processing module 270 may control the performance of the internal device based on setting information. In case geomagnetic sensor is in the specific state, the motion processing module 270 may display a menu for selecting whether to control the performance of the internal device. The motion processing module 270 may determine one of states including two or more steps as a specific state. The operations described above may be performed by one or more processors 220. Also, the motion processing module 270 may perform the operations described above under control of the processor 220. Additional information for the motion processing module 270 may be provided via FIGS. 3 to 8D.

As disclosed herein, a 'normal state' or an 'abnormal state' may be used in various embodiments of the present disclosure, and the abnormal state when the device is not in the normal state. According to an embodiment of the present disclosure, the electronic device 101 may determine whether the geomagnetic sensor operates in a predictable range (i.e., a range of a normal operation) based on sensing information obtained by the geomagnetic sensor and sensing information obtained by one or more motion sensors (e.g., an acceleration sensor, a gyro sensor). In the case where the geomagnetic sensor deviates from the normal range, the electronic device 101 may control one or more devices to adjust the sensing information obtained by the geomagnetic sensor to the range predictable by the electronic device 101. That is, the geomagnetic sensor included in the electronic device 101 may be in the abnormal state based on sensing information obtained by the geomagnetic sensor and based on sensing information obtained via at least one motion sensor, and this does not determine whether the geomagnetic sensor is broken. Therefore, the abnormal state may mean a result of comparing sensing information obtained by at least one motion sensor with sensing information obtained by the geomagnetic sensor 140P deviates the normal state that does not need to correct an operation environment of the geomagnetic sensor 140P.

According to various embodiments of the present disclosure, the abnormal state of the geomagnetic sensor 140P determined by the electronic device 101 may not determine whether the geomagnetic sensor 140P is broken. The electronic device 101 may determine the normal state of the electronic device 101 as a first normal state and a second normal state based on information set at a database. Likewise, the electronic device 101 may determine the abnormal state as a first abnormal state and a second abnormal state. According to various embodiments of the present disclosure, the electronic device 101 may not determine the operation state of sensing information obtained by the geomagnetic sensor 140P as a normal state and an abnormal state, but may determine the operation state of sensing information as a first state and a second state as described above. The electronic device 101 may set to determine whether to correct the geomagnetic sensor 140P depending on whether sensing information obtained by the geomagnetic sensor 140P is included in a range formed based on at least one state stored in a database. According to an embodiment of the present disclosure, the electronic device 101 may classify the operation state into a first state, a second state, a third state, and a fourth state depending on a small error sequence based on a degree of an error for sensing information obtained by a designated motion sensor (e.g., the magnetic field sensor 140B and/or the acceleration sensor 140E) and a designated component of sensing information obtained by the geomagnetic sensor 140P. In the case where sensing information obtained by the geomagnetic sensor 140P is not included in the range of a first normal state, the electronic device 101 may perform a correcting mode. In this case, the second state, the third state, and the fourth state may be described as abnormal states. According to another embodiment of the present disclosure, in the case where sensing information obtained by the geomagnetic sensor 140P is not within in the range of the first normal state and the second normal state, the electronic device 101 may perform the correcting mode. In this case, the third state, and the fourth state may be described as abnormal states.

Figure 3:
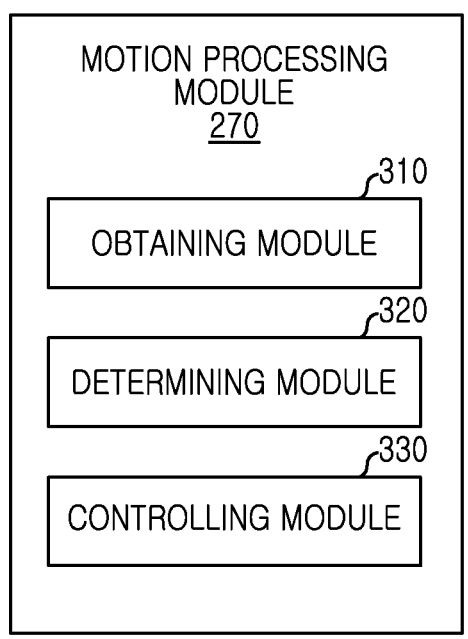
FIG. 3 is a block diagram illustrating a motion processing module in an electronic device according to an embodiment of the present disclosure.

FIG. 3 is a block diagram illustrating a motion processing module in an electronic device according to an embodiment of the present disclosure.

Referring to FIG. 3, the motion processing module 270 may include an obtaining module 310, a determining module 320, and a controlling module 330. The obtaining module 310 may obtain motion information of the electronic device 101 via at least one designated motion sensor included in the electronic device 101. According to an embodiment of the present disclosure, the obtaining module 310 may obtain motion information of the electronic device via various motion sensors such as the geomagnetic sensor 140P, the gyro sensor 140B, and the acceleration sensor 140E of the electronic device 101. The obtaining module 310 may obtain magnetic field information formed inside/outside the electronic device 101 via the geomagnetic sensor 140P of the electronic device 101, and obtain angular velocity information of the electronic device 101 or movement information of the electronic device 101 to a designated direction based on the obtained magnetic field information (e.g., a change of the magnetic field information). The obtaining module 310 may obtain an angular velocity of the electronic device 101 via the gyro sensor 140B, and obtain rotation information of the electronic device 101 based on the angular velocity. The obtaining module 310 may obtain movement information (e.g., acceleration information and/or velocity information) of the electronic device 101 via the acceleration sensor 140E, and obtain information of a direction in which the electronic device 101 moves based on the movement information.

The determining module 320 may compare motion information obtained by the geomagnetic sensor 140P of the electronic device 101 and motion information obtained by one or more motion sensors (e.g., the gyro sensor 140B and the acceleration sensor 140E), and determine whether an operation state of the geomagnetic sensor 140P is a normal state or an abnormal state. The determining module 320 may compare angular velocity information of the electronic device 101 obtained by the geomagnetic sensor 140P with angular velocity information of the electronic device 101 obtained by the gyro sensor 140B of the electronic device 101 to determine state information of the geomagnetic sensor 140P. The determining module 320 may compare movement information of the electronic device 101 obtained by the geomagnetic sensor 140P with movement information of the electronic device 101 obtained by the acceleration sensor 140E of the electronic device 101 to determine state information of the geomagnetic sensor 140P.

When an operation state of the geomagnetic sensor 140P of the electronic device 101 deviates (e.g., abnormal state) from a range of a normal state, the controlling module 330 may control performance of one or more internal devices functionally connected with the electronic device 101 based on a database and/or a data table stored in a memory. The controlling module 330 may control performance of a designated internal device depending on two or more control levels, and control performance of at least one internal device depending on a performance control mode (e.g., a power save mode) designated by the electronic device 101. In addition, the controlling module 330 may incorporate information regarding at least one internal device that may generate a magnetic field interference of the geomagnetic sensor 140P of the electronic device 101, and priority information of an internal device that may generate the magnetic field interference into the database of the electronic device 101, and control performance of at least one internal device depending on a designated priority based on the database.

Figure 4A:
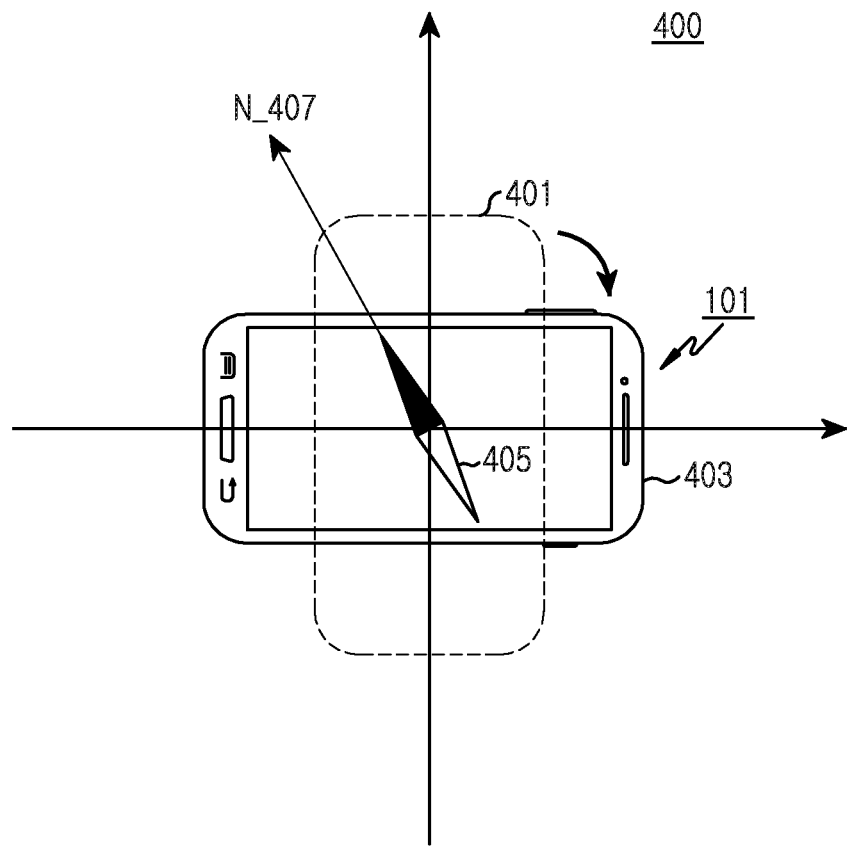

FIGS. 4A, 4B, and 4C are views illustrating an operation for detecting an error of sensing information of a geomagnetic sensor obtained by an electronic device according to an embodiment of the present disclosure.

The electronic device 101 may obtain motion information of the electronic device 101 such as angular velocity, acceleration (e.g., may include velocity), and an azimuth via one or more motion sensors (e.g., the gyro sensor 140B, the acceleration sensor 140E, the geomagnetic sensor 140P, etc.).

Hereinafter, various embodiments of the present disclosure are described with reference to FIG. 4A.

Referring to FIG. 4A, when obtaining sensing information (for example, intensity of a magnetic field) from the geomagnetic sensor 140P, the electronic device may determine whether the geomagnetic sensor 140P operates in a designated range (e.g., information set at the database and/or a range set in advance stored in the database) using sensing information obtained by at least one motion sensor (e.g., the gyro sensor 140B and the acceleration sensor 140E) of User Equipment (UE) 101.

According to an embodiment of the present disclosure the electronic device 101 may obtain information regarding a magnetic field via the geomagnetic sensor 140P included in the electronic device 101. The electronic device 101 may determine a perceivable reference coordinate at a designated position of the inside and the surface of the electronic device 101, and determine a coordinate 409 (e.g., a vector) of a specific direction (for example, a magnetic north direction) based on the reference coordinate and magnetic field information corresponding to the reference coordinate. The electronic device 101 may re-determine the coordinate 409 of the magnetic north direction at a designated time or when a designated condition occurs (for example, in the case where a change amount of intensity of a magnetic field becomes a predetermined value or more), and determine movement (e.g., a change 405 of an azimuth) of the electronic device 101. For example, the electronic device 101 may rotate clockwise from a first position 401 to a second position 403 of a plane designated as the x-axis and the y-axis. The electronic device 101 may obtain changed magnetic field information via the geomagnetic sensor 140P. The electronic device 101 may determine a coordinate of a changed magnetic north direction based on the changed magnetic field information and the reference coordinate. The electronic device 101 may determine designated information based on the clockwise rotation from the first position 401 to the second position 403. Likewise, in the case where the electronic device 101 moves based on the coordinate of the magnetic north direction and the reference coordinate of the electronic device 101, the electronic device 101 may determine information regarding a direction and/or velocity for a relevant movement. Hereinafter, direction information and/or velocity information of the electronic device 101 may be defined as geomagnetic information.

According to an embodiment of the present disclosure, the electronic device 101 may obtain angular velocity information for when the electronic device 101 rotates via the gyro sensor 140B. According to an embodiment of the present disclosure, the electronic device 101 may obtain acceleration information regarding and a movement direction when the electronic device 101 moves via the acceleration sensor 140E. Movement and direction information may represent a direction in which the electronic device 101 moves based on a coordinate system designated inside the electronic device 101.

When the electronic device 101 detects movement via the geomagnetic sensor 140P, the electronic device 101 may determine whether a change of geomagnetic field information (e.g., motion information determined using magnetic field information) is within a valid range (or a suitable range) based on angular velocity information of the gyro sensor 140B obtained at a point of obtaining geomagnetic information and/or movement and acceleration information of the acceleration sensor 140E.

Hereinafter, various embodiments of the present disclosure are described with reference to FIG. 4B.

The electronic device 101 may determine whether an operation of the geomagnetic sensor 140P is valid based on sensing information of at least one motion sensor that is obtained at a point which is the same as or similar to a point of obtaining magnetic field information via the geomagnetic sensor 140P. The electronic device 101 may control to compare one or more of magnetic field information, geomagnetic information 411 determined based on the magnetic field information, angular velocity information 413, and acceleration information 415.

According to an embodiment of the present disclosure corresponding to a comparison group table 410 of FIG. 4B, the electronic device 101 may determine a comparison degree of angular velocity information obtained via the corresponding gyro sensor 140B and acceleration information obtained via the acceleration sensor 140E depending on information (e.g., rotation information or acceleration information) designated by geomagnetic information 411 determined using the magnetic field information. Determining the validity of the geomagnetic sensor 140P is described with reference to the comparison group table 410. In case of a first comparison group data 421, geomagnetic information may include angular velocity information (e.g., 'A rotation') and movement information (e.g., B acceleration) of the electronic device 101, and may be compared with geomagnetic (e.g., in case of information regarding rotation, angular velocity information 'C rotation' obtained via the gyro sensor 140B, and in case of movement information, acceleration information 'D acceleration' obtained via the acceleration sensor 140E). When the geomagnetic information is the same as or similar to the geomagnetic information, the electronic device 101 may determine an operation of the geomagnetic sensor 140P as a normal state or an abnormal state. For example, in comparing rotation information, the electronic device 101 may compare information regarding 'A rotation' with information regarding 'C rotation'. In comparing acceleration information, the electronic device 101 the 'B acceleration' with the 'D acceleration'. When the comparison result is in a range which is the same within a designated range, the electronic device 101 may determine an operation of the geomagnetic sensor 140P as a normal state. When the rotation information and/or the acceleration information deviates from a similar designated range, the electronic device 101 may determine the operation of the geomagnetic sensor 140P as an abnormal state.

According to an embodiment of the present disclosure, in case of second comparison group data 423, geomagnetic information may include rotation information (e.g., no change) of the electronic device 101 and movement information (e.g., acceleration 'E acceleration'). In the case where a change of the rotation information of the geomagnetic information equal to or greater than a numerical value or does not exist, the electronic device 101 does not compare the rotation information, but determines a change of the angular velocity to determine an operation of the geomagnetic sensor 140P as a normal state or an abnormal state. For example, the angular velocity of the geomagnetic sensor may indicate that the electronic device 101 has not rotated, and rotation information obtained via the gyro sensor 140B indicates that the electronic device 101 has rotated, the electronic device 101 may determine an operation of the geomagnetic sensor 140P as an abnormal state. Also, in case of determining a result of comparing information regarding 'E acceleration' of the geomagnetic information with information regarding acceleration information 'F acceleration' of the acceleration sensor 140E deviates from the same or designated similar range, the electronic device 101 may determine an operation of the geomagnetic sensor 140P as an abnormal state.

According to an embodiment of the present disclosure, in case of third comparison group data 425, geomagnetic information may include rotation (e.g., rotation angular velocity 'G rotation') and movement velocity (e.g., no change) of the electronic device 101. In case of comparing information regarding 'G rotation' with the rotation information (e.g., 'H rotation') and determining the comparison result deviates from a range which is the same or designated similar range, or in case of determining acceleration information obtained via the acceleration sensor 140E has changed by a designated value and the electronic device 101 has moved, the electronic device 101 may determine an operation of the geomagnetic sensor 140P as an abnormal state.

According to an embodiment of the present disclosure, in case of fourth comparison group data 427, the electronic device 101 may include, in the geographic information from the geomagnetic sensor 140P, information of a state where the electronic device 101 has not rotated and a state where the electronic device 101 has not moved. When the angular velocity information obtained via the gyro sensor 140B meets a designated value and indicates that the electronic device 101 has rotated, or when the acceleration information obtained via the acceleration sensor 140E meets a designated value and indicates that the electronic device 101 has moved, the electronic device 101 may determine an operation of the geomagnetic sensor 140P as an abnormal state.

The electronic device 101 may not limit the above comparison group data but may include various comparison group data in a comparison group table 410. The electronic device 101 may compare magnetic field information obtained by the geomagnetic sensor 140P or geomagnetic information determined from the magnetic field information with sensing information of at least one motion sensor included in the electronic device 101 with reference to the comparison group table 410 to determine a normal state or an abnormal state of the operation of the geomagnetic sensor 140P. The above motion sensor is not limited to the gyro sensor 140B and the acceleration sensor 140E, but may include various sensor (e.g., a GPS, a slope sensor) information that may be compared with magnetic field information from the geomagnetic sensor 140P or information that has processed from the magnetic field information.

Hereinafter, various embodiments of the present disclosure are described with reference to FIG. 4C.

When the motion information (or sensing information) obtained via at least one motion sensor is greater than a designated value, the electronic device 101 may determine the electronic device 101 has moved (e.g., rotated or moved in a designated direction). According to an embodiment of the present disclosure, in when the movement of the electronic device 101 that is determined based on sensing information obtained by the geomagnetic sensor 140P and the movement of the electronic device 101 that is determined based on sensing information obtained by a motion sensor included in the electronic device 101 are different, the electronic device 101 may determine an operation state of the geomagnetic sensor 140P as an abnormal state. In case of determining the operation of the geomagnetic sensor 140P as an abnormal state, the electronic device 101 may control performance of one or more internal devices included in the electronic device 101. After controlling performance of a designated internal device, the electronic device 101 may reset whether the operation state of the geomagnetic sensor 140P is a normal state or an abnormal state. In case of determining the operation state of the geomagnetic sensor 140P as an abnormal state, the electronic device 101 may reset control of performance of one or more internal devices. In case of determining the operation state of the geomagnetic sensor 140P as a normal state, the electronic device 101 may maintain a state (e.g., a designated control level) controlling performance of a designated internal device. When an operation of the geomagnetic sensor 140P ends, the electronic device 101 may reset performance of an internal device that is being controlled.

Figure 5A:
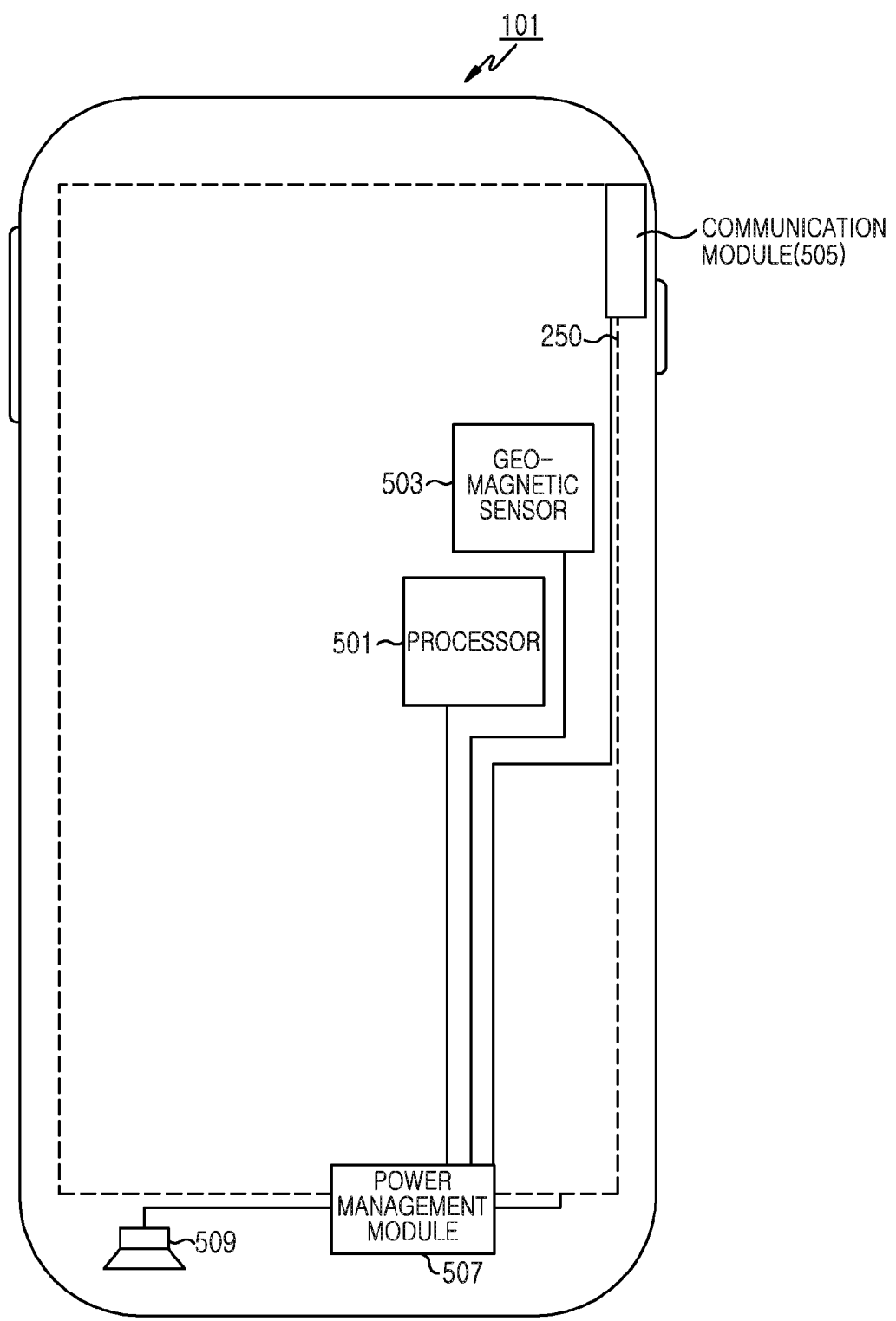
FIGS. 5A and 5B are views illustrating an operation for controlling performance of a designated internal device in response to an operation state of a geomagnetic sensor in an electronic device according to an embodiment of the present disclosure.
Figure 5B:

FIGS. 5A and 5B are views illustrating an operation for controlling performance of a designated internal device in response to an operation state of a geomagnetic sensor in an electronic device according to an embodiment of the present disclosure.

In case of determining an operation of the geomagnetic sensor 140P is an abnormal state, the electronic device 101 may control performance of designated internal devices.

Hereinafter, various embodiments of the present disclosure are described with reference to FIG. 5A.

One or more internal devices forming the electronic device 101 may be configured at a designated position with consideration of magnetic field interference. Although magnetic field interference has been considered as described above, interferences such as a magnetic field generated from a conducting wire transmitting, receiving a current in in proximity to an internal device, or a magnetic field generated by an internal device may affect performance of the geomagnetic sensor 140P.

When a performance abnormality has occurred in the geomagnetic sensor 140P, the electronic device 101 may control performance of one or more internal devices (e.g., a processor 220, a display unit, a communication module 320) included inside the electronic device 101 to correct magnetic field interference affecting the geomagnetic sensor 140P. According to an embodiment of the present disclosure, various internal devices included in the electronic device 101 may be mounted on one or more circuit boards and positioned at a designated position inside the electronic device 101. In case of determining an operation state of the geomagnetic sensor 140P as an abnormal state, the electronic device 101 may set priority of at least one internal device designated to control. For example, referring to FIG. 5A, when the operation state of the geomagnetic sensor 140P is an abnormal state, the electronic device 101 may determine one or more of a processor 501 (e.g., the processor 220), a communication module 505 (e.g., the communication module 320), a power management module 507 (e.g., a power management module 395), and a speaker 509 (e.g., the speaker 382) as the internal devices to control to reduce interference. In case of determining an operation state of the geomagnetic sensor 140P as an abnormal state, the electronic device 101 may set priority of an internal device whose performance is controlled depending on distance from the geomagnetic sensor 140P.

According to an embodiment of the present disclosure, in case of determining an operation of the geomagnetic sensor 140P as an abnormal state (e.g., one time of an abnormal state) depending on setting information, the electronic device 101 may control performance of the processor 501 if positioned closest to the geomagnetic sensor 140P. In controlling performance of an internal device, the electronic device 101 may divide a performance control level into two or more levels (e.g., a first control level and a second control level) and control performance of the internal device. In case of controlling performance of the processor 501 with the first control level, the electronic device 101 may perform determining a normal operation or an abnormal operation of the geomagnetic sensor 140P again. In controlling performance of the processor 501, the electronic device 101 may control a data processing speed (e.g., a clock) of the processor 501. If the processor 501 is a multi-core processor, the electronic device 101 may limit an operation of one or more cores. According to an embodiment of the present disclosure, when determining a normal state and an abnormal state of the geomagnetic sensor 140P, the electronic device 101 may perform the operation according to at least one of the methods performed in FIGS. 4A to 4C. After controlling performance of one or more internal devices (e.g., the processor 501), when the geomagnetic sensor 140P is in an abnormal state (e.g., two determinations of an abnormal state), the electronic device 101 may control (e.g., control to the second control level) again performance of an internal device (e.g., the processor 501) or control performance of another internal device (e.g., the communication module 505) set to a lower priority based on a distance in the setting information, or control performance of two or more internal devices. In controlling performance of the communication module 320, the electronic device 101 may control antenna power of a relevant communication module (e.g., an RF communication module 329) that is transmitting/receiving data. According to an embodiment of the present disclosure, the electronic device 101 may control performance of the processor 501 to the second control level again, control performance of the communication module 505 set to a lower priority that depends on a distance to the first control level, and then determine if the geomagnetic sensor 140P is in a normal state or an abnormal state. When the geomagnetic sensor 140P is now in a normal state, the electronic device 101 may maintain a performance control state of relevant internal devices, and perform an operation of the geomagnetic sensor 140P while maintaining the performance control state of an internal device. When the geomagnetic sensor 140P continues to be in an abnormal state, the electronic device 101 may repeatedly control performance of one or more internal devices based on the setting information and then determine an operation state of the geomagnetic sensor 140P. When an application (or a program) that uses the geomagnetic sensor 140P ends, the electronic device 101 may reset controlled internal devices. In addition, in case of controlling performance of the power management module 507, the electronic device 101 may control a charging current during battery charging. In case of controlling performance of the display 250, the electronic device may control brightness of the display 250. In controlling the at least one internal device, the electronic device 101 may control performance of an internal device according to a designated control level, or control performance of an internal device according to a power save mode designated by the electronic device 101.

Hereinafter, various embodiments of the present disclosure are described with reference to FIG. 5B.

In the case where an operation state of the geomagnetic sensor 140P has been determined as an abnormal state, the electronic device 101 may control performance of a designated internal device based on priority of the internal devices that may generate magnetic field interference. According to an embodiment of the present disclosure, in case of determining an operation state of the geomagnetic sensor 140P as an abnormal state, the electronic device 101 may include priority of controlled internal devices in sequence of a display 511 (e.g., the display 250 of FIG. 1), a communication module 513 (e.g., the communication module 320 of FIG. 3), a power management module 515 (e.g., the power management module 395 of FIG. 3), a processor 517 (e.g., the processor 220 of FIG. 1) and/or one or more designated internal devices.

In case of determining an operation of the geomagnetic sensor 140P as an abnormal state (e.g., one time of an abnormal state), the electronic device 101 may control performance of the display 511, which is designated as the first control priority in the setting information. In controlling performance of an internal device (e.g., the display 511), the electronic device 101 may divide a performance control level into two or more levels (e.g., a first control level and a second control level) and control performance of an internal device. After controlling performance of the display 511 to the first control level, the electronic device 101 may determine if the geomagnetic sensor 140P is in a normal state or an abnormal state. According to an embodiment of the present disclosure, when repeating the determining of a normal state or an abnormal state of the geomagnetic sensor 140P, the electronic device 101 may perform the any method described above in FIGS. 4A to 4C. After controlling performance of one or more internal devices (e.g., the display 511), when the geomagnetic sensor 140P remains in the abnormal state (e.g., two determinations of the abnormal state), the electronic device 101 may control (e.g., control to the second control level) again performance of an internal device (e.g., the display 511), or control performance of another internal device (e.g., the communication module 513) that is set to a second priority, or control performance of two or more internal devices. According to an embodiment of the present disclosure, the electronic device 101 may control performance of the display 511 using the second control level, control performance of the communication module 513 set to a lower priority in advance using the first control level, and again determine the state of the geomagnetic sensor 140P. When the geomagnetic sensor 140P is in a normal state, the electronic device 101 may maintain a performance control state of relevant internal devices and perform an operation of the geomagnetic sensor 140P. In case of determining an operation state of the geomagnetic sensor 140P as an abnormal state, the electronic device 101 may repeatedly control performance of one or more devices based on a designated control level in setting information, and determine an operation state of the geomagnetic sensor 140P. When an operation of an application that uses the geomagnetic sensor 140P ends, the electronic device 101 may reset a control level of one or more internal devices controlled to a designated control level.

FIG. 6 is a view illustrating an operation for controlling performance of a designated internal device in response to an operation state of a geomagnetic sensor in an electronic device according to an embodiment of the present disclosure.

Referring to FIG. 6, when at least one application included in the electronic device 101 operates, the electronic device 101 may include information (e.g., a degree of using a device depending on a program) of a consumption amount of at least one internal device. According to an embodiment of the present disclosure, when the application operates, the electronic device 101 may determine a display 603 (e.g., the display 250 of FIG. 1), a communication module 605 (e.g., the communication module 320 of FIG. 3), a camera 607 (e.g., the camera module 391 of FIG. 3), a processor 609 (e.g., the processor 220 of FIG. 1) and/or one or more internal devices as internal devices in use. For example, a degree table 600 illustrates device consumption based on a program that includes consumption information in designated units (e.g., percent %) such as a power consumption.

The electronic device 101 may execute a Facebook® application that uses the geomagnetic sensor 140P. In case of determining an operation state of the geomagnetic sensor 140P as an abnormal state (e.g., a first determination of an abnormal state), the electronic device 101 may control performance of an internal device whose power consumption is relatively lowest (e.g., the camera 607) with reference to information regarding a power consumption amount of a designated internal device (e.g., the display 603, the communication module 605, the camera 607, and a processor 709).

In controlling performance of an internal device (e.g., the display 511), the electronic device 101 may divide a performance control level into two or more levels (e.g., a first control level and a second control level) and control performance of the internal device. The electronic device 101 may then determine a normal state or an abnormal state of the geomagnetic sensor 140P after the control operation of a first internal device. According to an embodiment of the present disclosure, in performing an operation of determining a normal state or an abnormal state of the geomagnetic sensor 140P, the electronic device 101 may perform the operation according to at least one of the methods performed in FIGS. 4A to 4C. After controlling performance of the camera 607, the geomagnetic sensor 140P continues to be in the abnormal state (e.g., two determinations of the abnormal state), the electronic device 101 may control (e.g., control to the second control level) again performance of the camera 607, or control performance of another internal device (e.g., the processor 609) having the second lowest power. In case of determining an operation state of the geomagnetic sensor 140P as a normal state, the electronic device 101 may maintain a performance control state of relevant internal devices, and perform an operation of the geomagnetic sensor 140P while maintaining the performance control state of the internal devices. When the geomagnetic sensor 140P remains in the abnormal state, the electronic device 101 may repeatedly control performance of one or more internal devices. When an operation of an application that uses the geomagnetic sensor 140P ends, the electronic device 101 may reset a control level of one or more internal devices controlled to a designated control level.

Figure 7A:
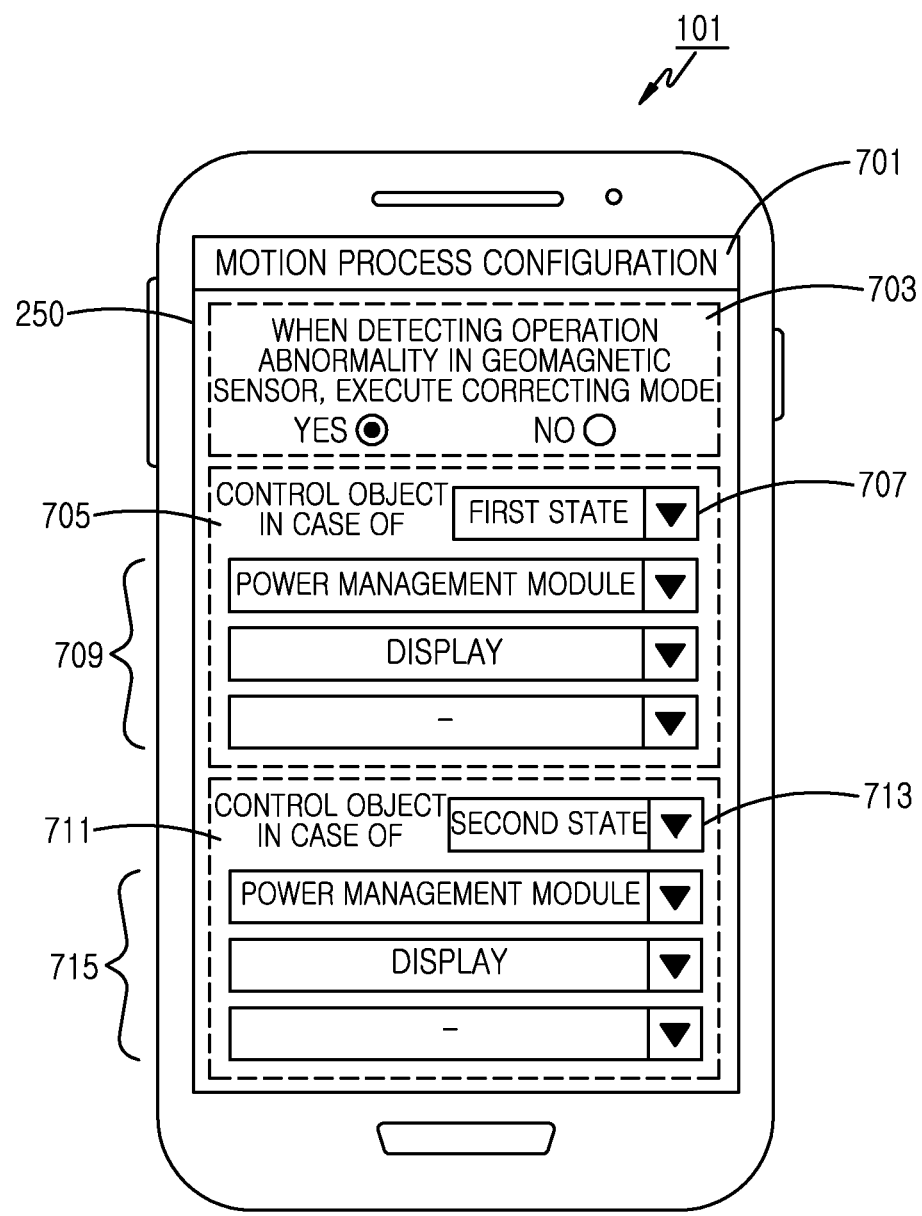
FIGS. 7A and 7B are views illustrating an operation for outputting information regarding performance control of a designated internal device in response to an operation state of a geomagnetic sensor in an electronic device according to an embodiment of the present disclosure.
Figure 7B:
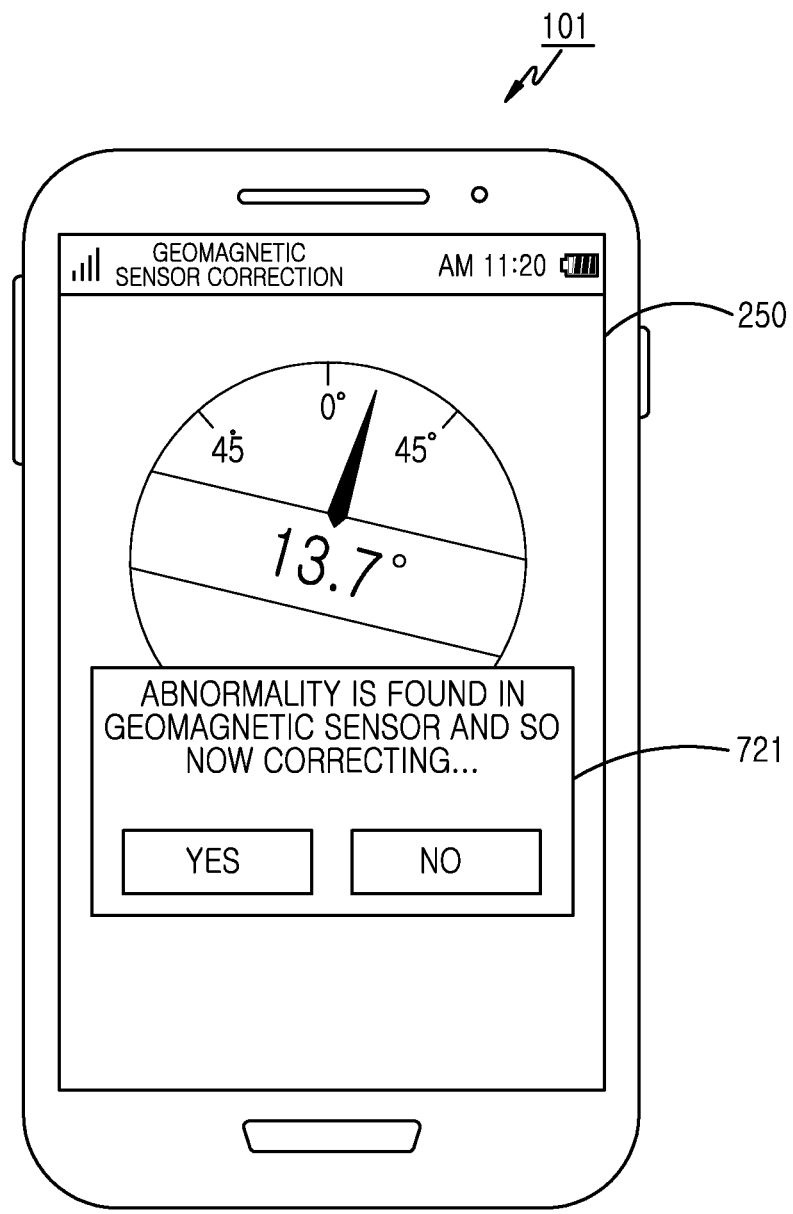

FIGS. 7A and 7B are views illustrating an operation for determining whether to perform a performance control of a designated internal device in response to an operation state of a geomagnetic sensor in an electronic device according to an embodiment of the present disclosure.

Hereinafter, various embodiments of the present disclosure are described with reference to FIG. 7A.

Referring to FIG. 7A, when t the geomagnetic sensor 140P is determined to be in the normal state, the electronic device 101 may provide a setting to correcting an operation of the geomagnetic sensor 140P. According to an embodiment of the present disclosure, the electronic device 101 may provide a motion processing configuration 701. In case of detecting an abnormal state in the motion processing configuration 701, the electronic device 101 may provide a menu 703 for selecting whether to perform a correction function. The electronic device 101 may provide a menu (e.g., first correction content 705 or second correction content 711) for selecting the correcting mode. The first correction content or the second correction content may allow a user to select a correction function for correcting the operation state of the geomagnetic sensor 140P. Referring to the first correction content 705, in case of performing the correction function, the electronic device 101 may select a condition required for performing correction of the first correction content 705. According to an embodiment of the present disclosure, if correction of the first correction content is selected for the first state 707, the electronic device 101 may correct the sensing information by comparing the sensing information of the geomagnetic sensor 140P with sensing information of at least one motion sensor (e.g., the gyro sensor 140B or the acceleration sensor 140E). In addition, when correcting the first correction content 705, the electronic device 101 may provide a first control object 709 to select at least one function of the electronic device 101. Referring to the set first control object 709, in case of performing the first correction, the electronic device 101 may control a power management module and a display of the electronic device 101. According to an embodiment of the present disclosure, in the case where a control step of the power management module and the display controlled by the electronic device 101 is divided into two or more steps (e.g., a first control step and a second control step functionally related to the first control step), a control step of the power management module and the display controlled by the first correcting mode may be controlled using the first control step. According to another embodiment of the present disclosure, in case of performing the second correction mode, in the case where it is set to control the power management module and the display of the electronic device 101 controlled in advance during the first correcting mode, the electronic device 101 may control the power management module and/or the display using the second control step.

According to various embodiments of the present disclosure, the geomagnetic sensor 140P is in the abnormal state, the electronic device 101 may perform a correction function based on setting information (e.g., the motion processing configuration 701) of the electronic device 101. In addition, in case of performing a correction function of the geomagnetic sensor 140P, the electronic device 101 may output relevant content via the display 250, the speaker 182, or the motor 198 (e.g., a vibration).

Hereinafter, various embodiments of the present disclosure are described with reference to FIG. 7B.

Referring to FIG. 7B, when controlling one or more internal devices depending on an operation state of the geomagnetic sensor 140P, the electronic device 101 may output information regarding an abnormal state of the geomagnetic sensor 140P and/or control (e.g., a correction function) of one or more internal devices.

According to an embodiment of the present disclosure, when the geomagnetic sensor 140P is in the abnormal state, the electronic device 101 may perform a correcting mode that corrects the abnormal state of the geomagnetic sensor 140P. The correcting mode performed by the electronic device 101 may control (e.g., controlling an amount of a current supplied to a designated internal device) performance of one or more internal devices to adjust magnetic field interference. According to various embodiments of the present disclosure, the correcting mode may be performed using one or more of the methods described above in FIGS. 5A to 6.

When mode of the geomagnetic sensor 140P is corrected, the electronic device 101 may output relevant information. According to an embodiment of the present disclosure, the electronic device 101 may display an abnormal result on the display 250, and/or output a notice regarding whether the correcting mode is performed. The electronic device 101 may provide a menu 721 for requesting user input to perform the correcting mode. Alternatively, after displaying information regarding on a designated region of the display 250 of the electronic device 101, if the user does not respond within a designated time, the electronic device 101 may automatically perform the correcting mode. The electronic device 101 is not limited to displaying information regarding an operation state (e.g., an abnormal state) of the geomagnetic sensor 140P on the display 250, but may output designated notice information regarding an abnormal state of the geomagnetic sensor 140P and/or correcting mode performance of the geomagnetic sensor 140P via various output units such as the speaker 382, the indicator 397, the motor 398 included in the electronic device 101.

FIGS. 8A, 8B, 8C, and 8D are flowcharts illustrating operations for correcting an abnormal state of a geomagnetic sensor in an electronic device according to an embodiment of the present disclosure.

The electronic device 101 may compare sensing information of an operation state of the geomagnetic sensor 140P with sensing information of one or more motion sensors included in the electronic device 101 to determine an operation state of the geomagnetic sensor 140P. In the case where the operation state of the geomagnetic sensor 140P is an abnormal state, the electronic device 101 may control performance of one or more internal devices included in the electronic device 101 to correct an operation of the geomagnetic sensor 140P.

Hereinafter, various embodiments of the present disclosure are described with reference to FIG. 8A.

Figure 8A:
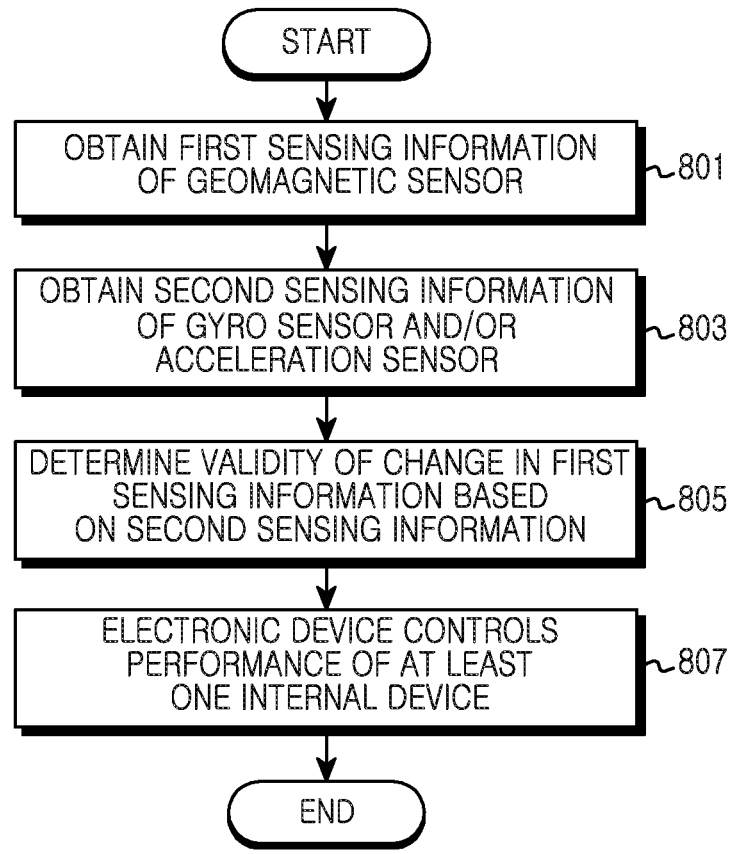
FIGS. 8A, 8B, 8C, and 8D are flowcharts illustrating operations for correcting an abnormal state a geomagnetic sensor in an electronic device according to an embodiment of the present disclosure.

Referring to FIG. 8A, in operation 801, the electronic device 101 may obtain sensing information (e.g., first sensing information) of the geomagnetic sensor 140P. The electronic device 101 may obtain magnetic field information outside the geomagnetic sensor 140P, and obtain information regarding various motions of the electronic device 101 such as coordinate information of magnetic north direction, rotation information (e.g., angular velocity) of the electronic device 101, and displacement information (acceleration and/or velocity) of the electronic device 101 with reference to one or more virtual coordinate systems.

In operation 803, the electronic device 101 may obtain sensing information (e.g., second sensing information) of motion of the electronic device 101 via one or more motion sensors (e.g., the gyro sensor 140B, the acceleration sensor 140E). According to an embodiment of the present disclosure, the electronic device 101 may obtain information regarding an angular velocity of the electronic device 101 via the gyro sensor 140B, and obtain displacement information (e.g., acceleration and velocity) of the electronic device 101 via the acceleration sensor 140E.

In operation 805, the electronic device 101 may compare one or more designated components (e.g., angular velocity, acceleration, or velocity) included in the first sensing information or the second sensing information, and determine an operation state of the geomagnetic sensor 140P depending on the comparison result. According to an embodiment of the present disclosure, in case of comparing information regarding a designated attribute (e.g., rotation angular velocity) of the first sensing information with a designated attribute (e.g., second sensing information of the gyro sensor 140B of the second sensing information, and determining movement of the electronic device 101 indicated by the first and second sensing information is different, the electronic device 101 may determine the geomagnetic sensor 140P is in the abnormal state.

In operation 807, when the geomagnetic sensor 140P is in the abnormal state, the electronic device 101 may control performance of one or more designated internal devices (e.g., the display 250, the communication module 320, the power management module 395, etc.) based on setting information of the electronic device 101 and/or designated information of a database. By controlling a designated internal device, the electronic device 101 may control magnetic field interference experienced by the geomagnetic sensor 140P, which is generated by an internal device (e.g., a performance-controlled internal device).

Hereinafter, various embodiments of the present disclosure are described with reference to FIG. 8B.

Figure 8B:
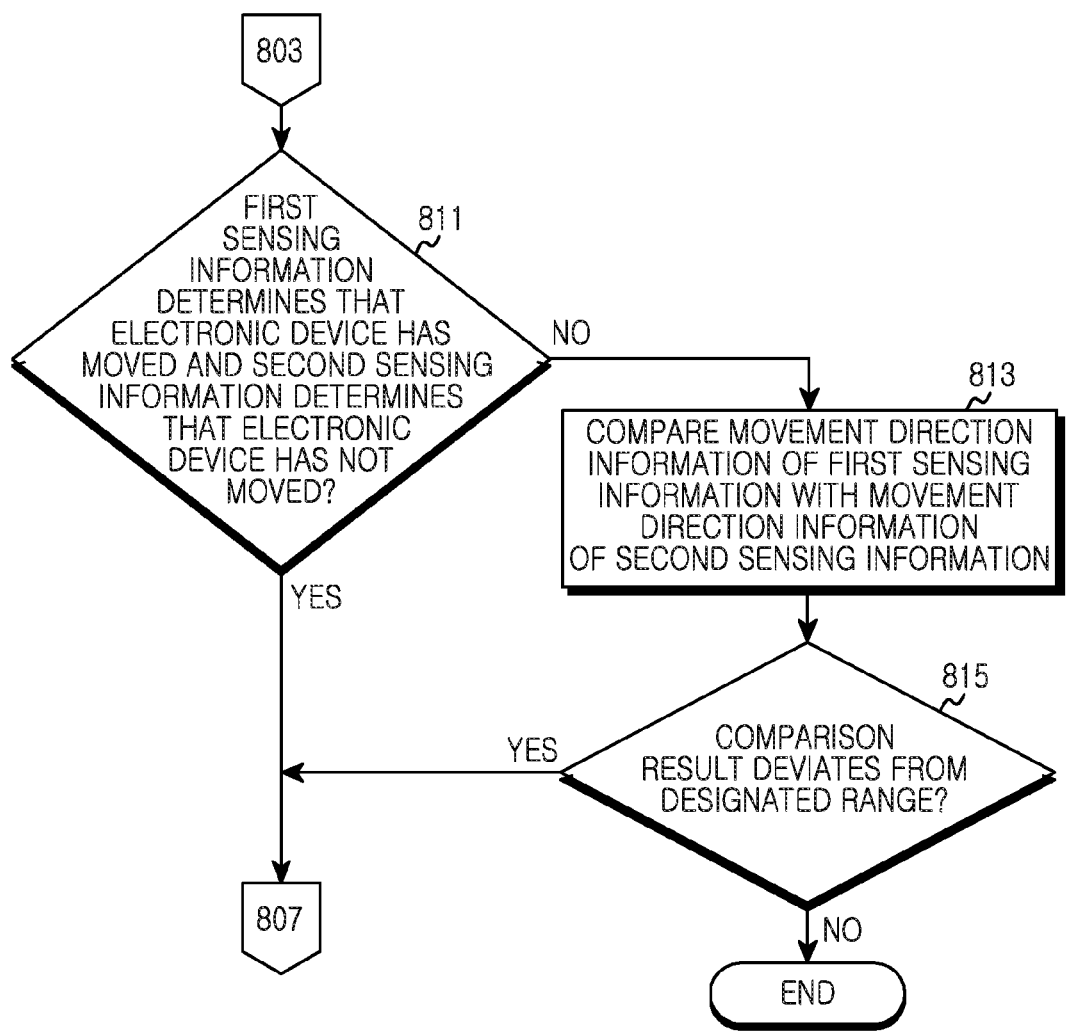

Referring to FIG. 8B, the electronic device 101 may describe various embodiments for operation 805 of FIG. 8A.

Referring to operation 811, the electronic device 101 determines if both the first sensing information and the second sensing information indicate that the electronic device has moved. If both the first sensing information and the second sensing information indicates that the electronic device 101 has moved, the electronic device performs 813 of FIG. 8B. However, if one of the first sensing information and the second sensing information indicates that the electronic device 101 has not moved, the electronic device 101 returns to operation 807 of FIG. 8A.

In operation 813, the electronic device 101 may compare information regarding a designated attribute of the first sensing information with a designated attribute of the second sensing information. According to an embodiment of the present disclosure, the electronic device 101 may compare angular velocity information in the first sensing information with angular velocity information in the second sensing information of the gyro sensor 140B. According to an embodiment of the present disclosure, the electronic device 101 may also compare information regarding movement information (e.g., acceleration and/or velocity) in the first sensing information with movement information in the second sensing information of the acceleration sensor 140E.

In operation 815, when the first sensing information is within a range of the second sensing information, the electronic device 101 may determine the geomagnetic sensor 140P is in the normal state and ends the operation of FIG. 8B. That is, when the geomagnetic sensor 140P is in the normal state, the process illustrated in FIG. 8A terminates without performing operation 807 of FIG. 8A. On the other hand, if the first sensing information is not within the range of the second sensing information, the electronic device 101 may perform operation 807 of FIG. 8A.

Hereinafter, various embodiments of the present disclosure are described with reference to FIG. 8C.

Figure 8C:
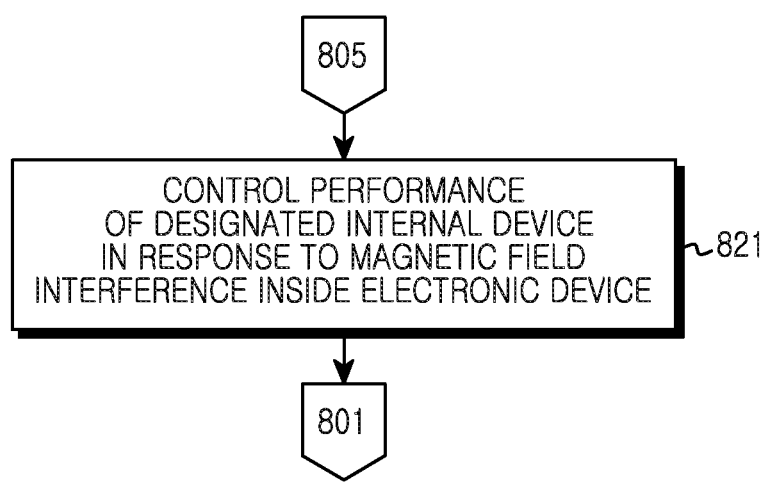

Referring to FIG. 8C, when the geomagnetic sensor 140P is in the abnormal state, as described above, the electronic device 101 control one or more internal devices included in the electronic device 101.

In operation 821, when the geomagnetic sensor 140P is in the abnormal state, the performance of one or more internal devices is controlled to adjust magnetic interference that affects the performance of the geomagnetic sensor 140P. As described above, the electronic device 101 may control performance of a designated internal device with reference to a data table (e.g., the data table 510) that dictates an internal device to adjust interference received by the geomagnetic sensor 140P. According to an embodiment of the present disclosure, the electronic device 101 may control an amount of a current supplied to a designated internal device or an amount of data processing of a designated internal device as described above. In case of controlling performance of the designated internal device, the electronic device 101 may perform operation 807 of FIG. 8A.

Hereinafter, various embodiments of the present disclosure are described with reference to FIG. 8D.

Figure 8D:
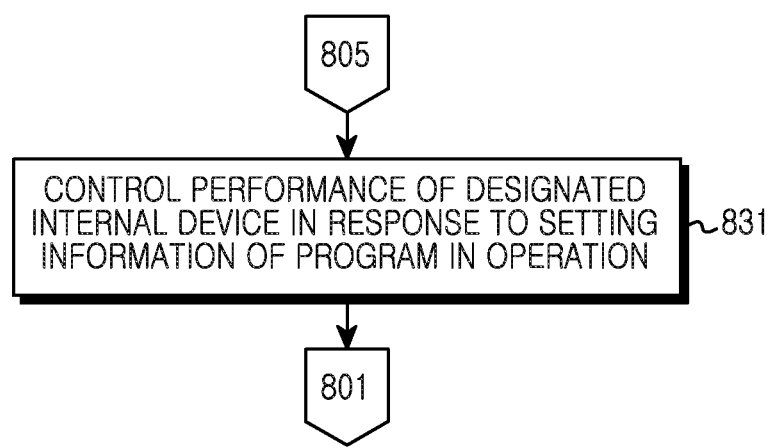

Referring to FIG. 8D, when the geomagnetic sensor 140P is in the abnormal state, the electronic device 101 may control one or more internal devices included in the electronic device 101.

In operation 831, when the geomagnetic sensor 140P is in the abnormal state, the performance of one or more internal devices is adjusted to affect magnetic interference. In case of executing one or more applications that uses the geomagnetic sensor 140P, the electronic device 101 may control performance of a designated internal device based on power consumption of a designated internal device used by a relevant program and/or processing information (ex: the data table 600) for the device that is processed by the processor 220. According to an embodiment of the present disclosure, the electronic device 101 may control an amount of a current supplied to a designated internal device or an amount of data for the designated internal device processed by the processor 220 according to the methods described in FIG. 6. In case of controlling performance of a designated internal device, the electronic device 101 may perform operation 807 of FIG. 8A.

According to various embodiments of the present disclosure, a method for operating an electronic device may include obtaining first sensing information of a geomagnetic sensor, obtaining second sensing information of designated at least one motion sensor, comparing designated attributes of the first sensing information and the second sensing information, and in case of determining the geomagnetic sensor as an abnormal state as a result of comparison, controlling performance of a designated internal device.

According to various embodiments of the present disclosure, the designated attribute of the first sensing information may include at least one of angular velocity information of the electronic device and movement information of the electronic device. According to various embodiments of the present disclosure, the movement information may include at least one of information regarding a velocity in a designated direction and information regarding acceleration in a designated direction. According to various embodiments of the present disclosure, the motion sensor may include at least one of a gyro sensor, an acceleration sensor, a slope sensor, and a gravity sensor included in the electronic device. According to various embodiments of the present disclosure, the designated attribute of the second sensing information may include at least one of movement information obtained via the acceleration sensor, and angular velocity information obtained via the gyro sensor. According to various embodiments of the present disclosure, a comparison may include an operation of comparing whether angular velocity information of the first sensing information is included in a designated range of rotation angular velocity information of the second sensing information. According to various embodiments of the present disclosure, a comparison operation may include comparing whether information regarding movement of the first sensing information is included in a designated range of information regarding movement of the second sensing information. According to various embodiments of the present disclosure, a designated internal device may be one or more of a display unit, a communication module, a camera module, and a processor functionally connected to an electronic device. According to various embodiments of the present disclosure, an operation of controlling performance may control at least one of a current supplied to a designated internal device, and an amount of data processing for an internal device processed by the processor. According to various embodiments of the present disclosure, after the operation of controlling, an operation of obtaining first sensing information, an operation of obtaining second sensing information, and an operation of comparing a designated attribute may be repeatedly performed. According to various embodiments of the present disclosure, in the case where a comparison result determines the geomagnetic sensor as a normal state, an operation of maintaining a control of a designated internal device may be further included. According to various embodiments of the present disclosure, a specific state may be a state where the comparison result deviates a range of a normal state designated by the electronic device. According to various embodiments of the present disclosure, the operation of controlling performance of an internal device may be performed based on selection designated by setting information. According to various embodiments of the present disclosure, in case of determining an operation state of the geomagnetic sensor as a specific state, an operation of displaying a menu for selecting whether to control performance of an internal device may be further included. According to various embodiments of the present disclosure, the specific state may be one of states formed of two or more steps.

In case of determining an operation of the geomagnetic sensor as an abnormal state, in controlling performance of designated at least one internal device, the electronic device may correct operation of the geomagnetic sensor due to a magnetic field interference received by the geomagnetic sensor.

According to various embodiments of the present disclosure, at least a portion of an apparatus and a method according to various embodiments described in claims and/or specification of the present disclosure may be implemented in a hardware, a software, a firmware, or in the form (e.g., a module) including a combination of two or more of the hardware, the software, and the firmware. The module is a minimum unit of an integrally configured part or a portion thereof, and may be a minimum unit or a portion thereof that performs various embodiments of the present disclosure. A module may be implemented mechanically or electronically. In case of implementation in a software, a non-transitory computer-decipherable storage medium (or a non-transitory computer-readable storage medium) storing one or more programs (or programming modules) may be provided. For example, a software may be implemented using an instruction stored in a non-transitory computer-readable storage medium in the form of a programming module. One or more programs may include an instruction allowing to execute methods according to embodiments described in claims and/or specification of the present disclosure. The instruction, when executed by one or more processors (e.g., the processor 220) may allow the one or more processors to perform a function corresponding to the instruction. A non-transitory computer-readable storage medium may be, for example, the memory 130. At least a portion of the programming module, for example, may be implemented (e.g., executed) by the processor 120. At least a portion of the programming module may include, for example, a module, a program, a routine, an instruction set or a process, etc. for performing one or more functions.

A non-transitory computer-readable recording medium may include a hard disk, a magnetic medium such as a floppy disk and a magnetic tape, an optical recording medium such as a Compact Disc (CD)-ROM, a DVD, a magnetoptical medium such as a floptical disk, and a hardware device specially configured for storing and performing a program instruction (e.g., a programming module) such as ROM, RAM, a flash memory, etc., an EEPROM, a magnetic disk storage device, or other types of optical storage devices, and a magnetic cassette. Alternatively, a programming module may be stored in a memory configured by a combination of all or a portion of these. Alternatively, a plurality of constituent memories may be provided.

In addition, a programming module may be stored in an attachable storage device that is accessible via a communication network such as the Internet, an intranet, a Local Area Network (LAN), a Wireless LAN (WLAN), or a Storage Area Network (SAN), or a communication network configured by a combination of these. This storage device may access an electronic device via an external port. Also, a separate storage device on a communication network may access a portable electronic device. The above hardware device may be configured to operate as one or more software modules in order to perform an operation of various embodiments of the present disclosure, and vice versa.

A module or a programming module according to various embodiments of the present disclosure may include one or more of the above-described elements, omit a portion thereof, or further include additional other elements. Operations performed by the module, the programming module, or other elements according to various embodiments of the present disclosure may be executed by a sequential, parallel, repetitive, or heuristic method. Also, a portion of operations may be executed in a different sequence, omitted, or another operation may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
   obtaining first sensing information of a geomagnetic sensor and second sensing information of at least one motion sensor;
   comparing designated attributes of the first sensing information with the second sensing information; and
   when determining an operation state of the geomagnetic sensor as a specific state depending on the comparison result, controlling performance of a designated internal device.

2. The method of claim 1, wherein the specific state is a state where a result of the comparison deviates from a range of a normal state designated by the electronic device.

3. The method of claim 1, wherein the designated attribute of the first sensing information comprises at least one of angular velocity information of the electronic device determined via the geomagnetic sensor, and movement information of the electronic device.

4. The method of claim 3, wherein the movement information comprises at least one of velocity information with respect to velocity in a designated direction and acceleration information with respect to acceleration in a designated direction.

5. The method of claim 1, wherein the designated attribute of the second sensing information comprises at least one of movement information obtained by an acceleration sensor, and angular velocity information obtained via a gyro sensor.

6. The method of claim 1, wherein the comparing comprises determining whether angular velocity information of the first sensing information is included in a designated range of angular velocity information of the second sensing information.

7. The method of claim 1, wherein the comparing of the first sensing information and the second sensing information comprises determining whether movement information of the first sensing information is within a designated range of the second sensing information.

8. The method of claim 1, wherein the controlling of the performance comprises controlling at least one of a current supplied to the designated internal device, or an amount of data processing for the designated internal device processed by a processor.

9. The method of claim 1, further comprising, when the determining of the operation state of the geomagnetic sensor as an abnormal state, repeatedly performing operations of:
   obtaining a third sensing information;
   obtaining a fourth sensing information;
   comparing the third sensing information with the fourth sensing information; and
   when the comparing of the third sensing information with the fourth sensing information determines an operation state of the geomagnetic sensor as a normal state, maintaining the control of the designated internal device.

10. The method of claim 1, further comprising:
when determining an operation state of the geomagnetic sensor as the specific state, displaying a menu configured to select whether to control performance of the designated internal device.

11. An electronic device comprising:
a geomagnetic sensor configured to obtain first sensing information;
a motion sensor configured to obtain second sensing information; and
a processor configured to:
obtain the first sensing information and the second sensing information from the at least one motion sensor,
compare designated attributes of the first sensing information with the second sensing information, and
when determining an operation state of the geomagnetic sensor as a specific state depending on the comparison result, control performance of a designated internal device.

12. The electronic device of claim 11, wherein the processor is further configured to determine a state where a result of the comparison deviates from a range of a normal state designated by the electronic device as the specific state.

13. The electronic device of claim 11, wherein the processor is further configured to determine at least one of angular velocity information of the electronic device determined via the geomagnetic sensor and movement information of the electronic device as the designated attribute of the first sensing information.

14. The electronic device of claim 13, wherein the processor is further configured to determine at least one of velocity information with respect to velocity in a designated direction and acceleration information with respect to acceleration in a designated direction as the movement information.

15. The electronic device of claim 11, wherein the processor is further configured to determine at least one of movement information via an acceleration sensor and angular velocity information obtained via a gyro sensor as the designated attribute of the second sensing information.

16. The electronic device of claim 11, wherein the processor is further configured to determine whether angular velocity information of the first sensing information is included within a range of angular velocity information of the second sensing information.

17. The electronic device of claim 11, wherein the processor is further configured to determine whether movement information of the first sensing information is within a designated range of movement information of the second sensing information.

18. The electronic device of claim 11, wherein the processor is further configured to control at least one of a current supplied to the designated internal device or an amount of data processing for the designated internal device processed by the processor to control the performance of the designated internal device.

19. The electronic device of claim 11, wherein, when the processor determines of the operation state of the geomagnetic sensor as an abnormal state, the processor is further configured to:
obtain a third sensing information,
obtain a fourth sensing information, and
compare the third sensing information with the fourth sensing information, and
wherein, when the processor compares of the third sensing information with the fourth sensing information and determines an operation state of the geomagnetic sensor as a normal state, the processor is further configured to maintain the control of the designated internal device.

20. The electronic device of claim 11, wherein, when the processor determines an operation state of the geomagnetic sensor as the specific state, the processor is further configured to display a menu configured to select whether to control the performance of the designated internal device.

* * * * *